United States Patent
Russell et al.

[11] Patent Number: 5,927,324
[45] Date of Patent: Jul. 27, 1999

[54] CROSS FLOW WITH CROSSMIRROR AND LOCK OUT CAPABILITY VALVE

[75] Inventors: Neil E. Russell, Bloomfield Hills, Mich.; Logan H. Mathis; C. Brian Wolfe, both of Lavonia, Ga.

[73] Assignee: Ross Operating Valve Company, Troy, Mich.

[21] Appl. No.: 08/770,878

[22] Filed: Dec. 20, 1996

Related U.S. Application Data

[60] Provisional application No. 60/033,016, Dec. 16, 1996.

[51] Int. Cl.$^6$ .......................... F15B 13/043; F15B 20/00
[52] U.S. Cl. ...................................... 137/596.16; 91/424
[58] Field of Search ...................... 91/424; 137/596.16, 137/596.14

[56] References Cited

U.S. PATENT DOCUMENTS

| | | |
|---|---|---|
| Re. 30,403 | 9/1980 | Bitonti . |
| Re. 31,161 | 3/1983 | Mahorney . |
| 1,290,865 | 1/1919 | Anthony . |
| 2,051,732 | 8/1936 | McKee . |
| 2,593,564 | 4/1952 | Ives . |
| 2,906,246 | 9/1959 | DiTirro et al. . |
| 2,954,009 | 9/1960 | Jullfs . |
| 2,995,141 | 8/1961 | Hipp . |
| 3,139,109 | 6/1964 | Ruchser ................................ 91/424 X |
| 3,280,951 | 10/1966 | Jordan . |
| 3,371,759 | 3/1968 | Sapolsky . |
| 3,670,767 | 6/1972 | Mahorney . |
| 3,757,818 | 9/1973 | Sweet . |
| 3,834,621 | 9/1974 | Pacht et al. . |
| 3,858,606 | 1/1975 | Cameron . |
| 4,075,928 | 2/1978 | Bitonti . |
| 4,181,148 | 1/1980 | Russell et al. . |
| 4,257,455 | 3/1981 | Cameron . |
| 4,345,620 | 8/1982 | Ruscher et al. . |
| 4,353,392 | 10/1982 | Ruscher et al. . |
| 4,542,767 | 9/1985 | Thornton et al. . |
| 4,903,727 | 2/1990 | Motzer .................................. 91/424 X |
| 4,903,728 | 2/1990 | Motzer .................................. 91/424 X |
| 4,903,729 | 2/1990 | Motzer .................................. 91/424 X |
| 5,113,907 | 5/1992 | Russell . |

FOREIGN PATENT DOCUMENTS

| | | |
|---|---|---|
| 1099294 | 8/1961 | Germany . |
| 38890 | 8/1965 | Germany . |
| 41174 | 11/1965 | Germany . |
| 2750895 A1 | 5/1979 | Germany . |
| 3032336 A1 | 3/1981 | Germany . |
| 1294747 | 11/1972 | United Kingdom . |
| 2010448 | 6/1979 | United Kingdom . |
| 2057638 | 4/1981 | United Kingdom . |

*Primary Examiner*—Gerald A. Michalsky
*Attorney, Agent, or Firm*—Harness, Dickey & Pierce, P.L.C.

[57] ABSTRACT

A control valve system has two valve trains each of which has a series of valves which dynamically move between a deactuated position and an actuated position. An inlet of the valve system is connected to an outlet of the valve system when all of the valves are actuated and the outlet of the valve system is connected to an exhaust when all of the valves are deactuated. Each valve train includes a solenoid valve which when actuated moves the remaining valve members to their actuated position. The various valves of each valve train are interconnected with the valve of the other valve train such that actuation of all of the valves in a substantially simultaneous manner will connect the inlet of the valve system to the outlet of the valve system and deactuation of all of the valves in a substantially simultaneous manner will connect the outlet to the exhaust. The valve system monitors the dynamic movement of the valve members during its operation will move to a locked out condition when any valve is in a deactuated position and when one other valve is in an actuated position. In the locked out condition, the outlet of the valve system is corrected to the exhaust. The valve system will remain in this locked out condition until a resetting operation is performed.

20 Claims, 9 Drawing Sheets

CROSS FLOW WITH CROSSMIRROR AND LOCK OUT CAPABILITY VALVE

This application claims priority of Provisional Application Ser. No. 60/033,016 filed Dec. 16, 1996.

FIELD OF THE INVENTION

The present invention relates to a control valve. More particularly, the present invention relates to a dual poppet fluid control valve which, when an abnormal situation is encountered, the valve moves to a locked out position which then requires a resetting operation before the control valve will again function.

BACKGROUND AND SUMMARY OF THE INVENTION

Machine tools of various types operate through a valving system which interacts with a pneumatic controlled clutch and/or brake assembly. For safety reasons, the control valves which are used to operate these machine tools require the operator to actuate two separate control signal applying contacts essentially simultaneously. This requirement of simultaneous application ensures that the operator will not have his hand near the moving components of the machine tool when an operating cycle is initiated. The two control signal applying contacts can then be connected to the valving system which allows compressed air to be delivered to the machine tool to perform its operating cycle.

Safety rules and regulations require the valving system to be designed such that if a component in the valving system malfunctions, the valving system will not allow additional movement of the machine tool. In addition, the valving system must ensure that a new operation cycle of the machine tool cannot be initiated after a component of the valving system has become defective.

Prior art electromagnetic valving systems which are utilized for the operation of machine tools meet these safety requirements through the use of a double valve assembly. The double valve assembly, includes two electromagnetic supply valves which are normally closed. Each of the supply valves is moved to an open position in response to an electrical control signal. The two supply valves are arranged in series with respect to the source of compressed air. The double valve assembly also includes two exhaust valves which are normally open. Each exhaust valve is closed by a respective supply valve when it is opened. It is therefore necessary for the supply valves to be opened simultaneously otherwise, supply air will be exhausted from the system through one of the exhaust valves. The opening and closing of the valve units is monitored by sensing air pressures in the respective valve units and then compare these two pressures. The monitoring and comparing of these two pressures is accomplished by using a single air cylinder which is separated into two chambers by a piston. The pressure in each valve unit is delivered to one of the chambers. Thus, unequal pressures in the valve units will cause movement of the normally static piston which will then interrupt the electrical signal to one of the valve units. This and other external electronic monitoring arrangements are expensive and require that electrical signal processing equipment be designed and utilized.

The continued development of the valving systems for machine tools has been directed toward more reliable, simpler and less costly valving systems which both meet and exceed the safety performance requirements in force today as well as those proposed for the future.

The present invention provides the art with a control valve system which operates entirely pneumatically thus eliminating the need for electrical monitoring and the associated controls. The control valve system includes a plurality of valves each of which open or close during the actuation or deactuation of the valves. The control valve system monitors the dynamic movement of the various valves of the system to ensure the proper functioning of the control valve system. The control valve system moves to a locked out position upon sensing a malfunction and remains in this locked out position until a resetting operation is performed. Thus, the operation of the control assembly is totally dynamic and the system does not rely on the monitoring of a static member to ensure its proper function.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
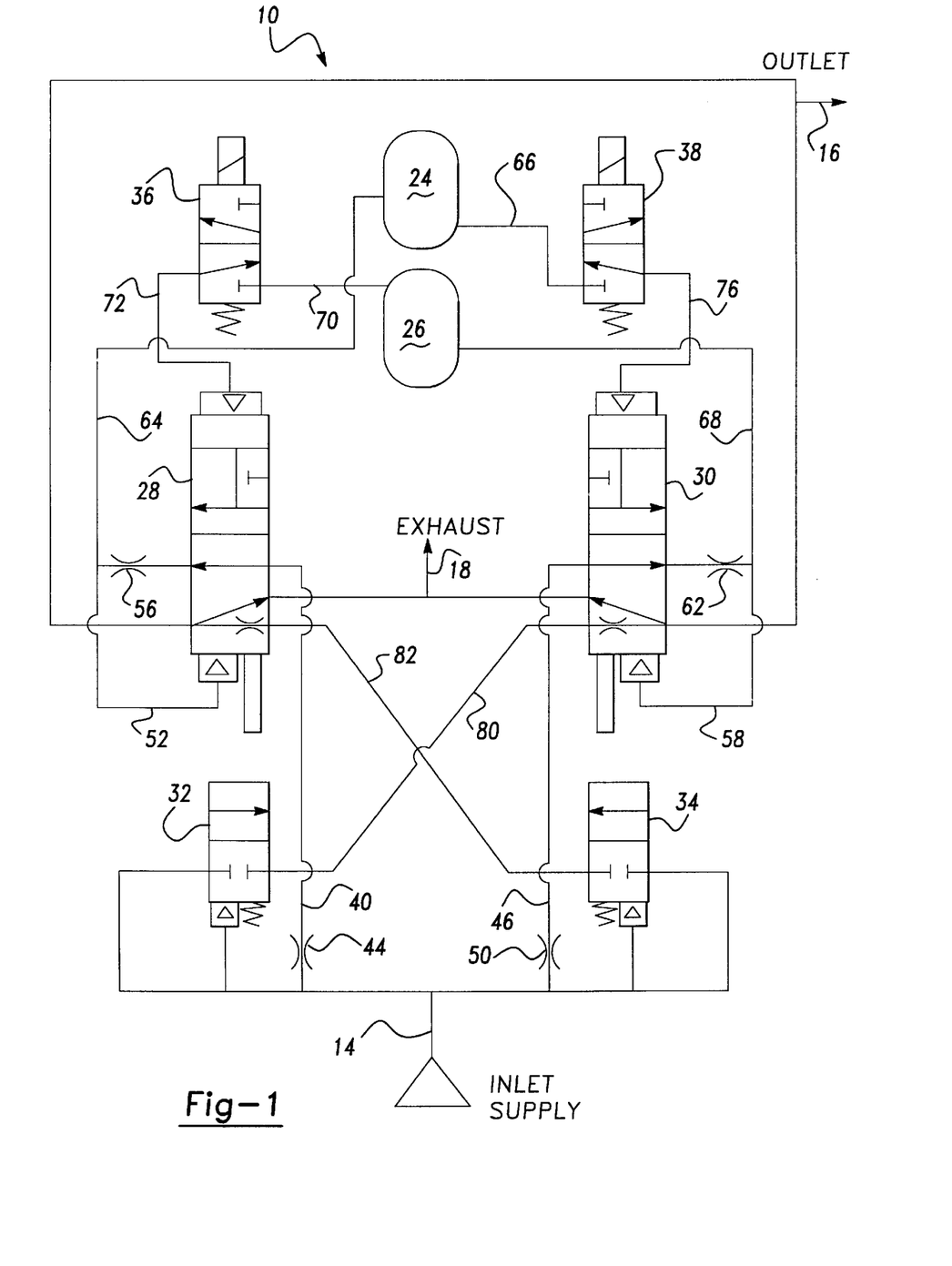
FIG. 1 is a schematic circuit diagram of the control valve system of the present invention shown in a deactuated position.
Figure 2:
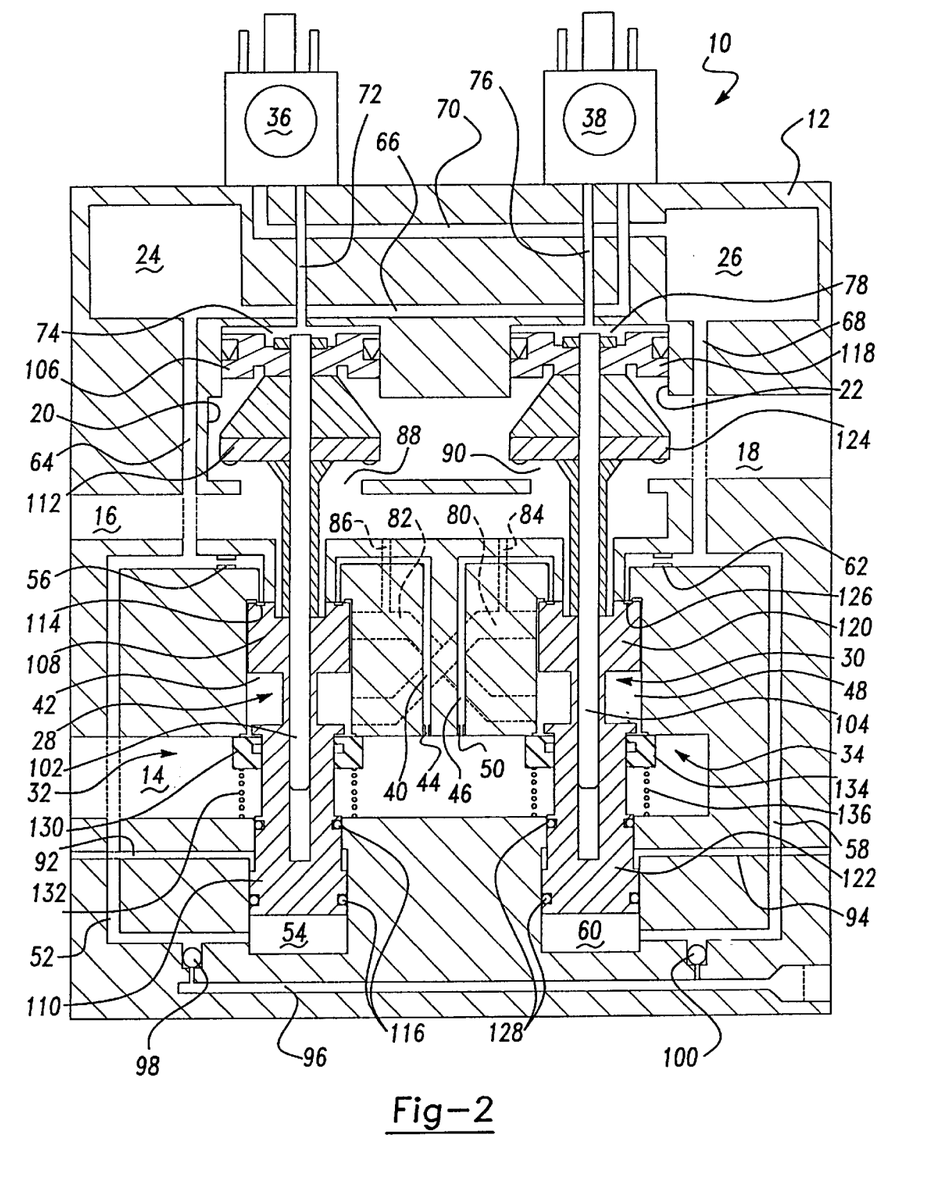
FIG. 2 is a schematic illustration of the control valve shown in its deactuated position.

Referring now to the drawings in which like reference numerals designate like or corresponding parts throughout the several views, there is shown in FIGS. 1 and 2 a control valve system in accordance with the present invention which is designated generally by the reference numeral 10. Control valve system 10 is shown as a schematic fluid circuit in FIG. 1 and as a fluid control valve in FIG. 2.

Referring now to FIG. 2, control valve system 10 comprises a housing 12 having a fluid inlet passage 14, a fluid outlet passage 16, a fluid exhaust passage 18, a first valve bore 20, a second valve bore 22, a first fluid reservoir 24 and a second fluid reservoir 26. Disposed within first valve bore 20 is a first valve member 28 and disposed within second valve bore 22 is a second valve member 30. Located within inlet passage 14 in a coaxial relationship with first valve member 28 is a third valve member 32. Also located within inlet passage 14 in a coaxial relationship with second valve member 30 is a fourth valve member 34. A pair of solenoid valves 36 and 38 are attached to housing 12.

A plurality of fluid passages interconnect valve bores 20 and 22 with inlet 14, outlet 16, exhaust 18, reservoir 24, reservoir 26, valve 36 and valve 38. A fluid passage 40 extends between inlet passage 14 and an intermediate chamber 42 formed by bore 20. A restrictor 44 is disposed within passage 40 to limit the amount of fluid flow through passage 40. A fluid passage 46 extends between inlet passage 14 and an intermediate chamber 48 formed by bore 22. A restrictor 50 is disposed within passage 46 to limit the amount of fluid flow through passage 46.

A fluid passage 52 extends between chamber 42 and a lower chamber 54 formed by bore 20. A restrictor 56 is disposed within passage 52 to limit the amount of fluid flow through passage 52. A fluid passage 58 extends between chamber 48 and a lower chamber 60 formed by bore 22. A restrictor 62 is disposed within passage 58 to limit the amount of fluid flow through passage 58. A fluid passage 64 extends between passage 52 and reservoir 24 such that restrictor 56 is located between chamber 42 and reservoir 24. A fluid passage 66 extends between reservoir 24 and the input to solenoid valve 38. A fluid passage 68 extends between passage 58 and reservoir 26 such that restrictor 62 is located between chamber 48 and reservoir 24. A fluid passage 70 extends between reservoir 26 and the input to solenoid valve 36. A passage 72 extends between the output of solenoid valve 36 and an upper chamber 74 formed by bore 20. A passage 76 extends between the output of solenoid valve 38 and an upper chamber 78 formed by bore 22.

A cross passage 80 extends between the lower portion of chamber 42 and the upper portion of chamber 48. A cross passage 82 extends between the lower portion of chamber 48 and the upper portion of chamber 42. A fluid passage 84 extends between passage 80 and outlet passage 16. A fluid passage 86 extends between passage 82 and outlet passage 16. Outlet passage 16 is in communication with exhaust passage 18 through two ports 88 and 90. The upper portions of chambers 54 and 60 are in communication with atmospheric pressure through passages 92 and 94, respectively. A reset passage 96 extends into housing 12 and is in communication with the lower portion of chambers 54 and 60 by communicating with passages 52 and 58, respectively. A pair of check valves 98 and 100 are disposed between reset passage 96 and passages 52 and 58 respectively, to prohibit fluid flow between passages 52 or 58 to reset passage 96 but allow fluid flow from reset passage 96 to one or both passages 52 and 58.

Disposed within bore 20 is valve member 102 and disposed within bore 22 is valve member 104. Valve member 102 comprises an upper piston 106, an intermediate piston 108 and a lower piston 110 all of which move together as a single unit. Upper piston 106 is disposed within chamber 74 and includes a valve seat 112 which opens and closes port 88 located between outlet passage 16 and exhaust passage 18. Intermediate piston 108 is disposed within chamber 42 and includes an annular passage 114 which fluidly connects passage 40 to passage 52 when piston 108 is seated against housing 12. Lower piston 110 is located within chamber 54 and includes a pair of seals 116 which seal inlet passage 14 from passage 92 and seal chamber 54 from passage 92. Valve member 104 comprises a upper piston 118, an intermediate piston 120 and a lower piston 122 all of which move together as a single unit. Upper piston 118 is disposed within chamber 78 and includes a valve seat 124 which opens and doses port 90 located between outlet passage 16 and exhaust passage 18. Intermediate piston 120 is disposed within chamber 48 and includes an annular passage 126 which fluidly connects passage 46 to passage 58 when piston 120 is seated against housing 12. Lower piston 122 is located within chamber 60 and includes a pair of seals 128 which seal inlet passage 14 from passage 94 and seal chamber 60 from passage 94.

Valve member 32 is located around lower piston 110 and comprises a valve seat 130 and a valve spring 132. Valve spring 132 biases valve seat 130 against housing 12 to prohibit fluid flow between inlet passage 14 and chamber 42. Valve member 34 is located around piston 122 and comprises a valve seat 134 and a valve spring 136. Valve spring 136 biases valve seat 134 against housing 12 to prohibit fluid flow between inlet passage 14 and chamber 48.

FIGS. 1 and 2 illustrate control valve system 10 in its deactuated position. Pressurized fluid from input passage 14 is biasing valve seats 130 and 134 against housing 12 closing communication between inlet passage 14 and both chambers 42 and 48. Pressurized fluid is provided to passage 40 through restrictor 44, to passage 52 through annular passage 114 through restrictor 56 and into chamber 54 to bias valve member 102 upward as shown in FIG. 2 seating piston 108 against housing 12. Pressurized fluid also flows through passage 52, through passage 64 to reservoir 24 and from reservoir 24 to the inlet of solenoid valve 38 through passage 66. In a similar manner, pressurized fluid from input passage 14 is provided to passage 46 through restrictor 50 to passage 58 through annular passage 126 through restrictor 62 and into chamber 60 to bias valve member 104 upward as shown in FIG. 2 seating piston 120 against housing 12. Pressurized fluid also flows through passage 58, through passage 68 to reservoir 26 and from reservoir 26 to the inlet of solenoid valve 36 through passage 70. Outlet passage 16 is in communication with exhaust passage 18 due to valve seats 112 and 124 being biased upward opening ports 88 and 90. Intermediate chambers 42 and 48 are also open to exhaust passage 18 through cross passages 80 and 82, respectively, through passages 84 and 86, respectively. The fluid pressure below piston 110 and 122 of valve members 102 and 104, respectively, bias valve members 102 and 104 upward maintaining control valve system 10 in the deactuated position. The connection between passages 40 and 52 through annular passage 114 and the connection between passages 46 and 58 through annular passage 126 maintain fluid pressure within chambers 54 and 60 and reservoirs 24 and 26.

Figure 3:
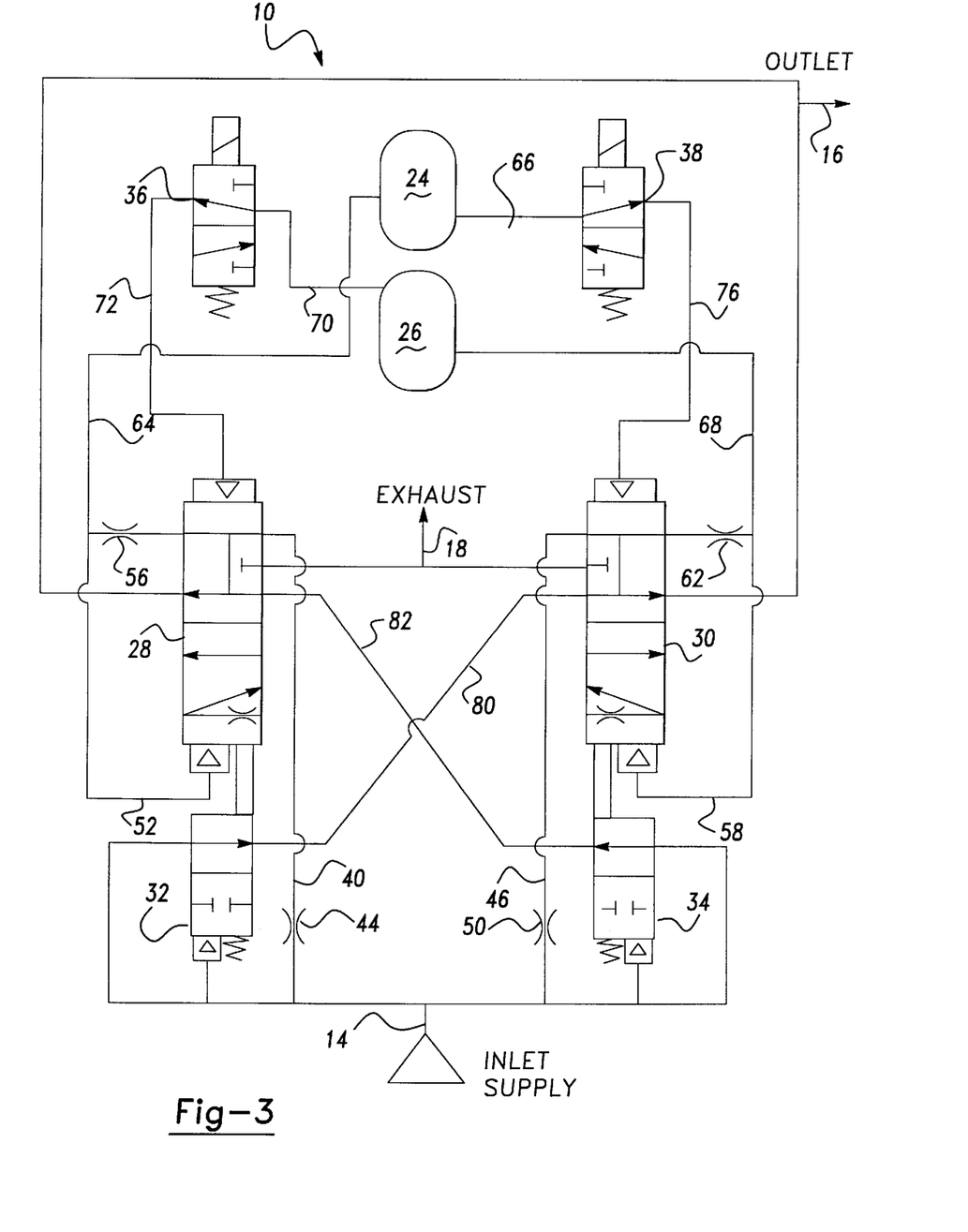
FIG. 3 is a schematic circuit diagram of the control valve system of the present invention shown in an actuated position.
Figure 4:
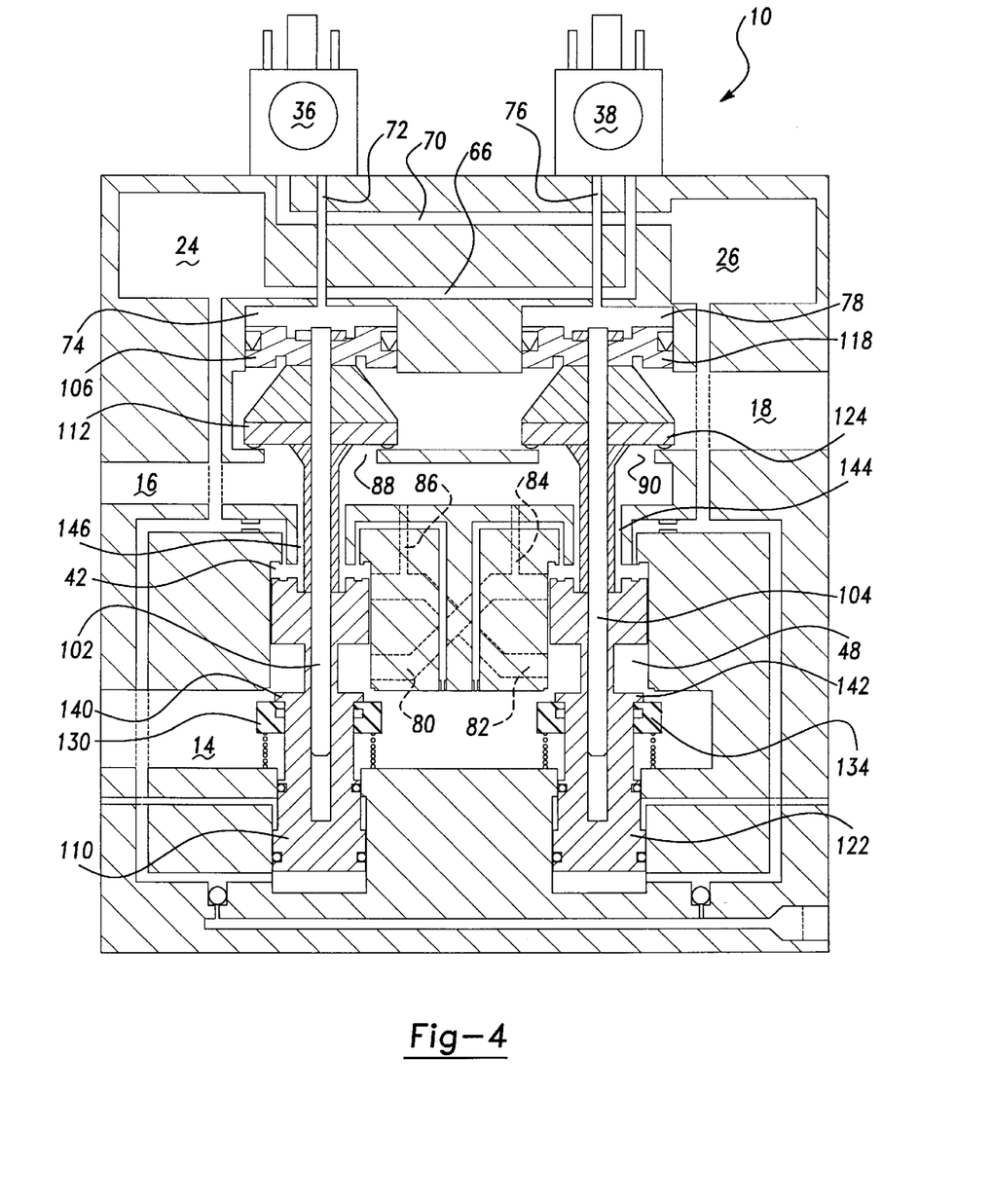
FIG. 4 is a schematic illustration of the control valve shown in its actuated position.

FIGS. 3 and 4 illustrate control valve system 10 in its actuated position. Both solenoid valves 36 and 38 have been substantially simultaneously actuated. The actuation of solenoid valve 36 connects passage 70 and thus reservoir 26 to passage 72. Pressurized fluid is directed into chamber 74 to move valve member 102 downward as shown in FIG. 4. The diameter of piston 106 is larger than the diameter of piston 110 thus causing the load which moves valve member 102 downward. In a similar manner, the actuation of solenoid valve 38 connects passage 66 and thus reservoir 24 to passage 76. Pressurized fluid is directed into chamber 78 to move valve member 104 downward as shown in FIG. 4. The diameter of piston 118 is larger than the diameter of piston 122 thus causing the load which moves valve member 104 downward. When valve members 102 and 104 move downward, an annular flange 140 on piston 110 unseats valve seat 130 and an annular flange 142 on piston 122 unseats valve 134. Pressurized fluid flows from inlet passage 14 into the lower portion of chamber 42 through passage 80 to the upper portion of chamber 48 and through a gap 144 between valve member 104 and housing 12 to provide pressurized fluid to outlet passage 16. Pressurized fluid also flows through passage 84 to outlet passage 16. In a similar manner, pressurized fluid flows from inlet passage 14 into the lower portion of chamber 48 through passage 82 to the upper portion of chamber 42 and through a gap 146 between valve member 102 and housing 12 to provide pressurized fluid to outlet passage 16. Pressurized fluid also flows through passage 86 to outlet passage 16. The movement of valve members 102 and 104 downward seats valve seats 112 and 124 against housing 12 to close ports 88 and 90 to isolate outlet passage 16 from exhaust passage 18. The fluid pressure within reservoirs 24 and 26 will initially be reduced when valves 36 and 38 are actuated but the fluid pressure will return to supply pressure at inlet 14 because reservoirs 24 and 26 are still open to inlet 14 and outlet 16 is isolated from exhaust 18.

Figure 5:
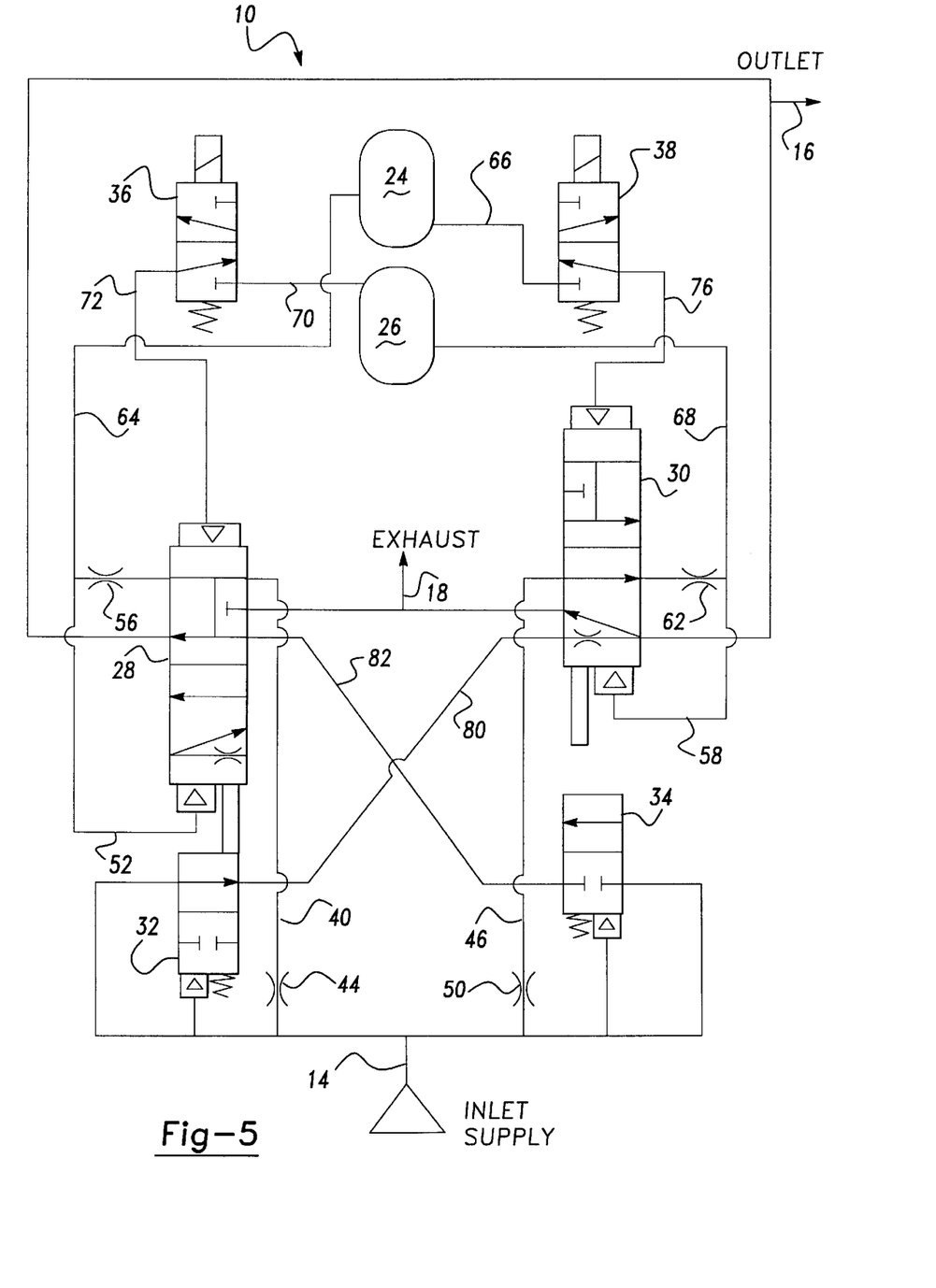
FIG. 5 is a schematic circuit diagram of the control valve system of the present invention shown in an abnormal position.
Figure 6:
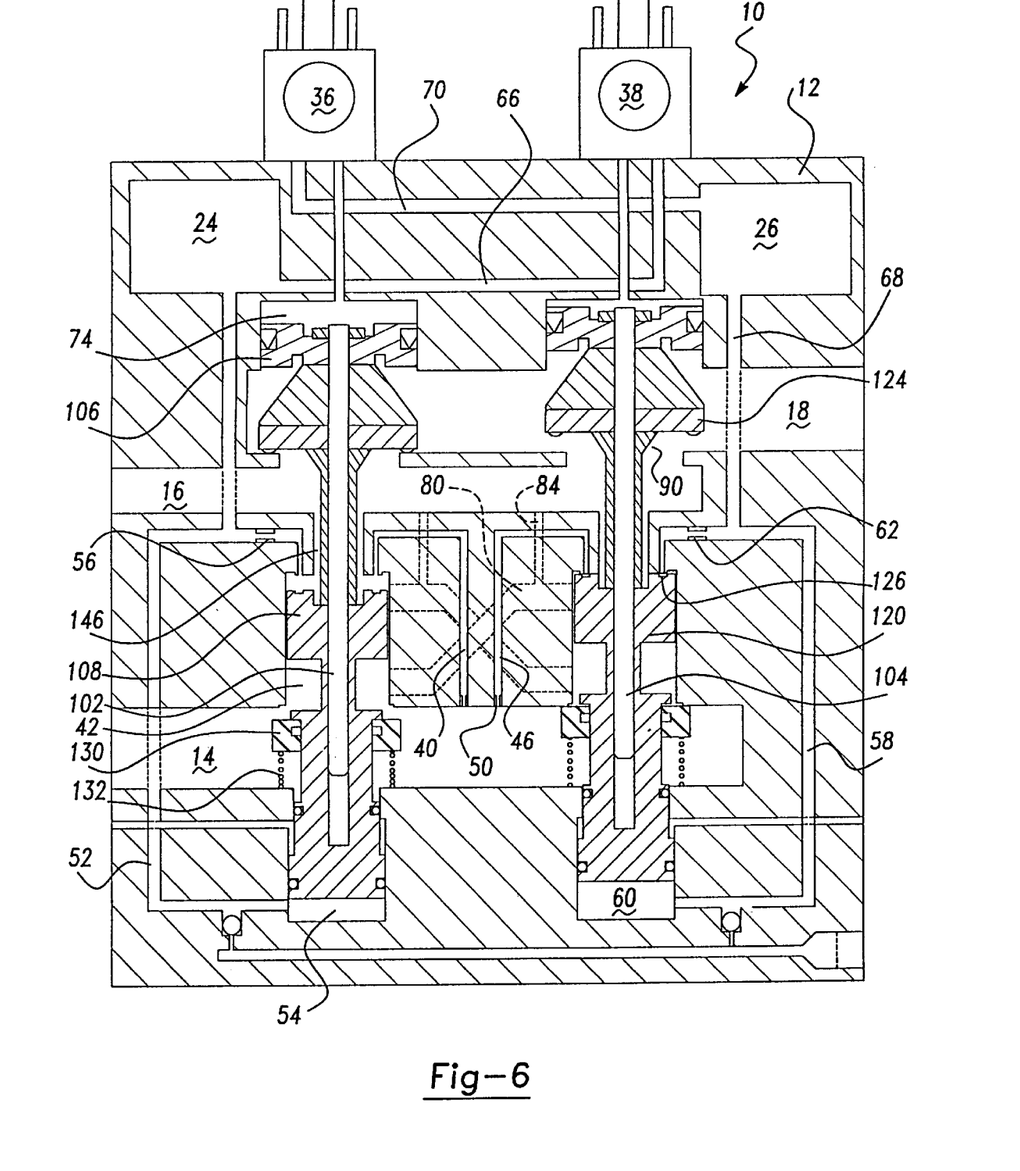
FIG. 6 is a schematic illustration of the control valve shown in its abnormal position.

FIGS. 5 and 6 illustrate control valve system 10 in an abnormal position. In FIGS. 5 and 6, valve member 104 is located in its upward position while valve member 102 is located in its lower position. Both solenoid valves 36 and 38 are located in their deactuated position. Valve body 104 is located in its upward position similar to that shown in FIG. 1. Pressurized fluid from inlet passage 14 is supplied to passage 46 through restrictor 50 to passage 58 through annular passage 126 through restrictor 62 and into chamber 60 to bias valve member 104 upward as shown in FIG. 6 seating piston 120 against housing 12. Pressurized fluid also flows through passage 68 to reservoir 26 and from reservoir 26 to the inlet of solenoid valve 36 through passage 70. Outlet passage 16 is in communication with exhaust passage 18 due to valve seat 124 being biased upward opening port 90. Valve body 102 is located in its lower position which opens various passages to outlet passage 16 which, because the position of valve body 104, is open to exhaust 18. The upper portion of chamber 42 is open to exhaust through gap 146. Pressurized fluid from inlet passage 14 is bled to exhaust through passage 40 and through the upper portion of chamber 42 through gap 146, through outlet passage 16, through port 90 to exhaust passage 18. In addition, pressurized fluid from inlet passage 14 will bleed to exhaust 18 by entering the lower portion of chamber 42, flow through passage 80, through passage 84, through outlet passage 16, through port 90 and into exhaust passage 18. Pressurized fluid in passage 52 and thus chamber 54 is also bled to exhaust through restrictor 56 which removes the biasing being applied to valve body 102. In addition, fluid pressure in reservoir 24 is bled to exhaust through restrictor 56 removing the pressurized fluid being supplied to solenoid valve 38 through passage 66. The amount of time for chamber 54 and reservoir 24 to bleed to exhaust will depend upon the size of chamber 54, reservoir 24 and restrictor 56. With the release of pressurized air from chamber 74 above piston 106 and the presence of pressurized air within inlet passage 14 acting against the bottom of valve seat 130, valve spring 132 will move valve body 102 to an intermediate position where valve seat 130 is seated against housing 12 but piston 108 is not seated against housing 12. This condition is shown in FIGS. 7 and 8.

Figure 7:
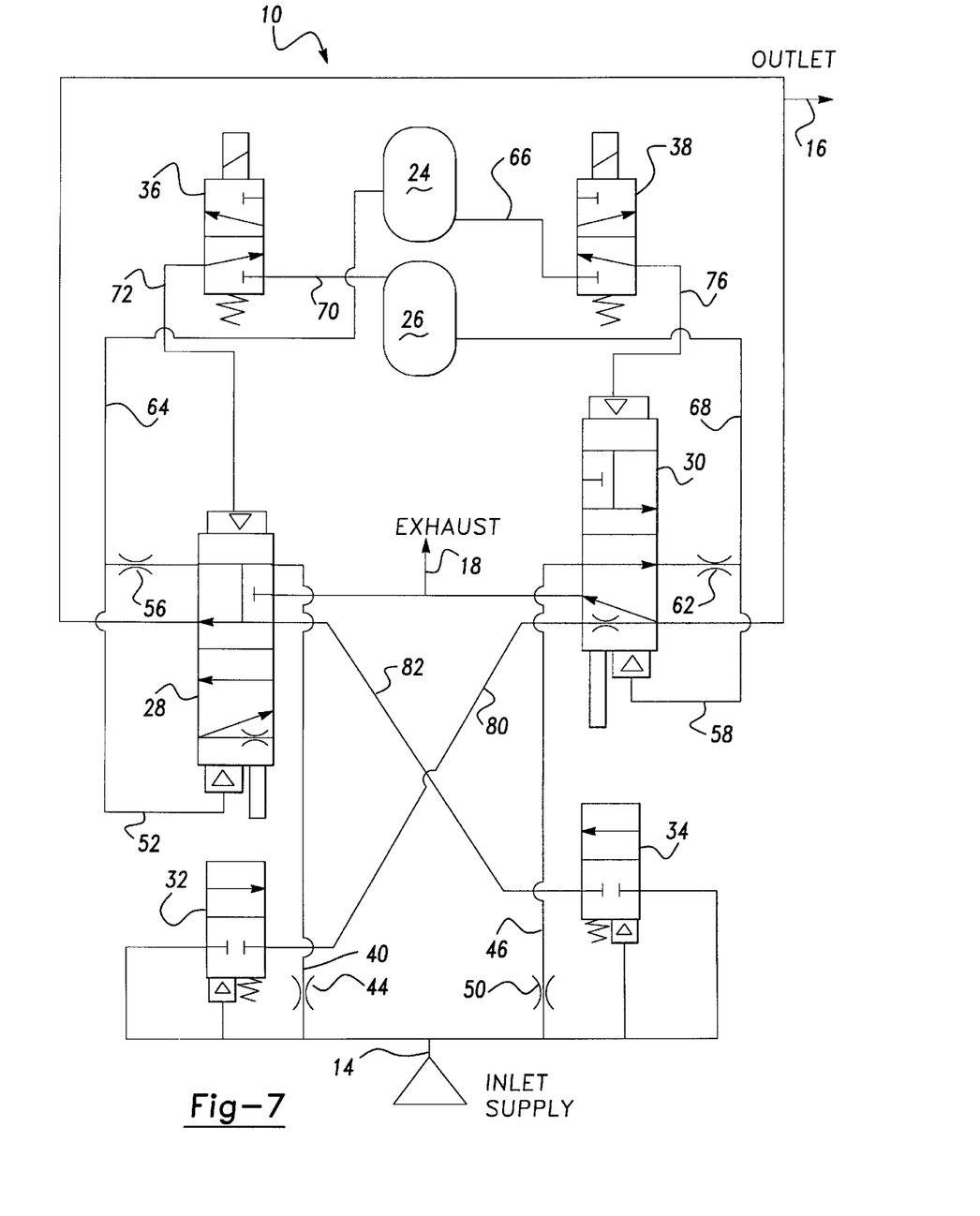
FIG. 7 is a schematic circuit diagram of the control valve system of the present invention shown in a locked out position.
Figure 8:
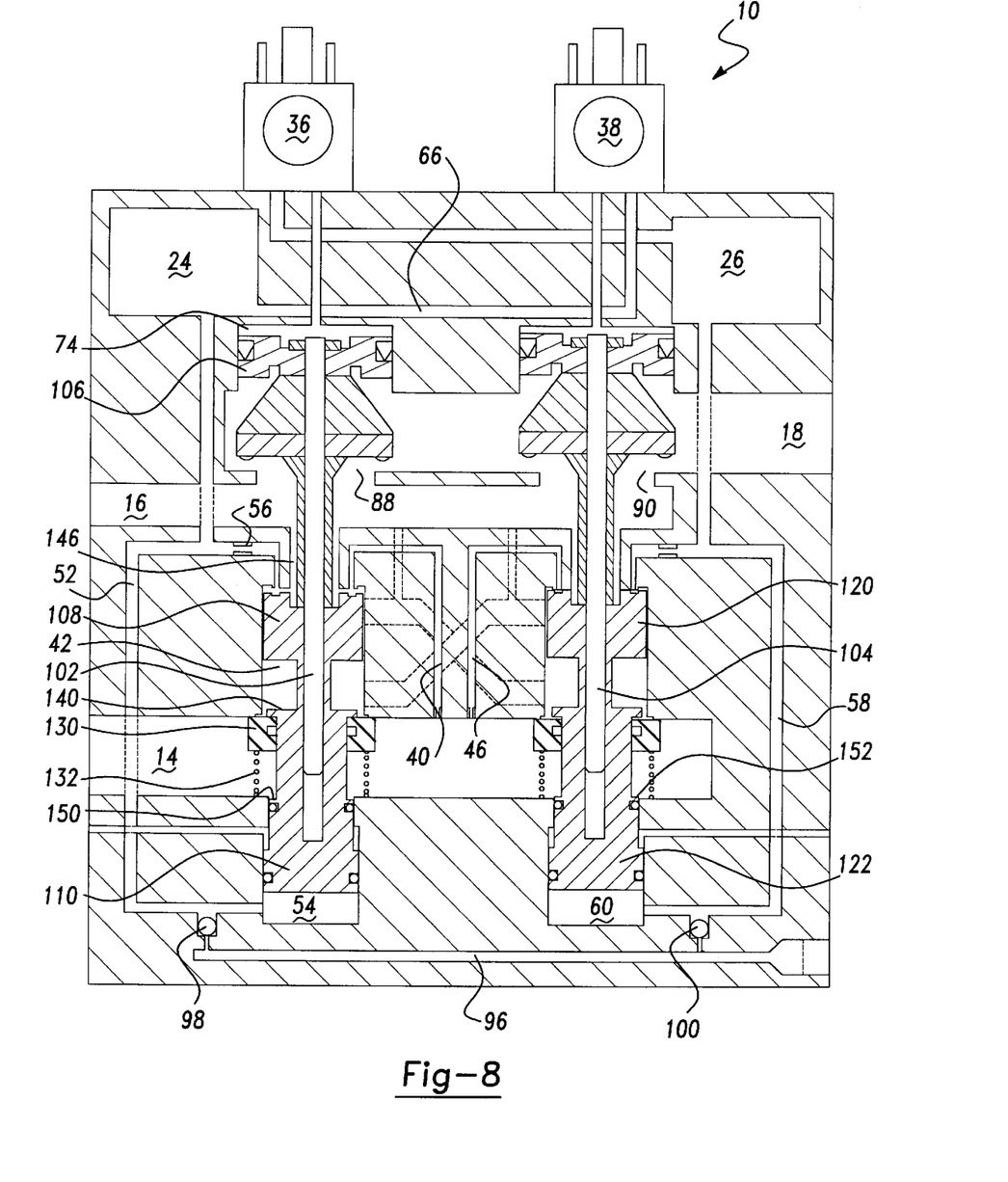
FIG. 8 is a schematic illustration of the control valve shown in its locked out position.

FIGS. 7 and 8 illustrate control valve system 10 in a locked out position. When valve seat 130 urges valve member 102 upwards due to the biasing of valve spring 132, valve seat 130 pushes against annular flange 140 to move valve member 102. Because of a lost motion attachment between valve seat 132 and piston 110, when valve seat 132 engages housing 12, piston 108 has not yet engaged housing 12. Additional movement of valve body 102 is required to seat piston 108 against housing 12 and connect passage 40 to passage 52 and provide pressurized fluid to chamber 54 and reservoir 24. Without the seating of piston 108 to housing 12, the upper portion of chamber 42 and thus passages 40 and 52 are open to exhaust 18 through gap 146, outlet passage 16 and ports 88 and 90 and exhaust passage 18. Thus reservoir 24 is open to exhaust along with passage 66 and the input to solenoid valve 38. Chamber 54 is also open to exhaust eliminating any biasing load which would urge valve body 102 upward to seat piston 108 against housing 12. An annular shoulder 150 located on piston 110 and open to inlet passage 14 biases valve body 102 downward with annular flange 140 being urged against valve seat 130 to keep valve body 102 in its intermediate position and control valve system 10 in its locked out position. A similar shoulder 152 is located on piston 122.

When it is desired to move control valve system 10 from its locked out position to its deactuated position shown in FIG. 1, pressurized fluid is supplied to reset passage 96. Pressurized fluid being supplied to reset passage 96 opens check valve 98 and pressurized fluid fills reservoir 24 and chamber 54. Restrictor 56 will limit the amount of fluid bled off to exhaust during the resetting procedure. Once reservoir 24 and chamber 54 are filled with pressurized fluid, the fluid within chamber 54 acts against piston 110 to move valve body 102 upward to seat piston 108 against housing 12. Fluid passage 40 is again in communication with passage 52 and control valve system 10 is again positioned in its deactuated position as shown in FIGS. 1 and 2.

While the above description of FIGS. 5 through 8 have been described with valve body 102 being located in its intermediate and locked out position and valve body 104 being located in its deactuated position, it is to be understood that a similar locked out position of control valve system 10 would occur if valve body 102 were located in its deactuated condition and valve body 104 were located in its intermediate and locked out condition. The resetting procedure of applying pressurized fluid to reset passage 96 would cause the pressurized fluid to open check valve 100 to fill reservoir 26 and chamber 60. The pressurized fluid in chamber 60 would lift valve body 104 to seat piston 120 against housing 12 reconnecting passage 46 with passage 58.

Thus, control valve system 10 is a fully fluidically operating valve system which has the capability of sensing an abnormal condition and responding to this abnormal condition by switching to a locked out condition which then requires an individual to go through a resetting operation before control valve system 10 will again function.

Figure 9:
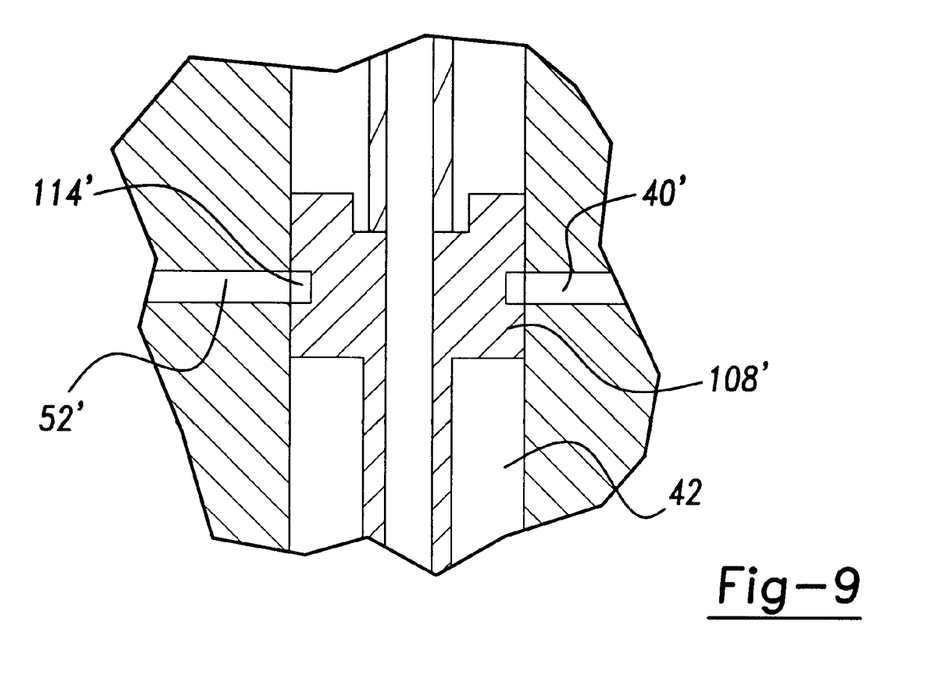
FIG. 9 is a schematic illustration of the valving system in accordance with another embodiment of the present invention.

FIG. 9 illustrates another embodiment of the present invention. In the embodiment shown in FIGS. 1–8, piston 108 includes annular passage 114 located in an upper surface of piston 108 to fluidically connect passage 40 with passage 52. FIG. 9 illustrates a piston 108' which fluidically connects a passage 40' with a passage 52' through a passage 114' located on the external surface of piston 108'. In a similar manner, piston 120 of valve body 104 could be replaced with piston 108'. Fluid passage 40' is the same as fluid passage 40 and fluid passage 52' is the same as fluid passage 52 with the exception that passages 40' and 52' enter chamber 42 through a vertical wall whereas passages 40 and 52 enter chamber 42 through a horizontal wall. The operation of the embodiment shown in FIG. 9 is identical to that described above for FIGS. 1 through 8.

While the above detailed description describes the preferred embodiment of the present invention, it should be understood that the present invention is susceptible to modification, variation and alteration without deviating from the scope and fair meaning of the subjoined claims.

What is claimed is:

1. A control valve system comprising:
   a housing defining a reset port, an inlet, an outlet and an exhaust;
   a first passage extending between said inlet and said outlet;
   a second passage extending between said outlet and said exhaust;
   a first plurality of valves disposed within said first passage, each of said first plurality of valves being movable between a deactuated position where said first passage is closed and an actuated position where said first passage is open;
   a second plurality of valves disposed within said second passage, each of said second plurality of valves being movable between a deactuated position where said second passage Is open and an actuated position where said second passage is closed;
   means for maintaining one of said first plurality of valves in said actuated position when one other of said first plurality of valves is in said deactuated position; and
   a reset passage extending between said first passage and said reset port, each of said first plurality of valves being moved to said deactuated position when a pressurized fluid is supplied to said reset port.

2. The control valve system according to claim 1 wherein, said first plurality of valves comprises a first valve assembly disposed within said first passage and said second plurality of valves comprises a second valve assembly disposed within said second passage.

3. The fluid control valve system according to claim 2 wherein, said first plurality of valves comprises a third valve assembly disposed between said inlet and said first valve assembly.

4. The fluid control valve system according to claim 3 wherein, said first plurality of valves comprises a fourth valve assembly disposed between said inlet and said first valve assembly.

5. The control valve system according to claim 1 wherein, said first a plurality of valves comprises a first and a second valve assembly disposed within said first passage and said second plurality of valves comprises a third and a fourth valve assembly disposed within said second passage.

6. The fluid control valve system according to claim 5 wherein, said first plurality of valves comprises a fifth valve assembly disposed between said inlet and said first valve assembly and said second plurality of valves comprises a sixth valve assembly disposed between said inlet and said second valve assembly.

7. The fluid control valve system according to claim 6 wherein, said first plurality of valves comprises a seventh valve assembly disposed between said inlet and said first valve assembly and said second plurality of valves comprises an eighth valve assembly disposed between said inlet and said second valve assembly.

8. The control valve system according to claim 1 further comprising means for maintaining one of said second plurality of valves in said actuated position when one other of said second plurality of valves is in said deactuated position, said reset passage extending between said second passage and said reset port, each of said second plurality of valves being moved to said deactuated position when said pressurized fluid is supplied to said reset port.

9. A control valve system comprising:
   a housing defining a reseat an Inlet, an outlet and an exhaust;
   a first passage extending between said inlet and said outlet;
   a second passage extending between said outlet and said exhaust;
   a first valve disposed within said first passage, said first valve being movable between a deactuated position where said first passage Is closed and an actuated position where said first passage is open:
   a second valve disposed within said second passage, said second valve being movable between a deactuated position where said second passage is open and an actuated position where said second passage is closed;
   a first biasing member for biasing said first and second valves into said deactuated position;
   a third valve disposed within said first passage, said third valve being movable between a deactuated position where said first passage is closed and an actuated position where said first passage is open;
   a fourth valve disposed within said second passage, said fourth valve being movable between a deactuated position where said second passage is open and an actuated position where said second passage Is closed;
   a second biasing member for biasing said third and fourth valves Into said deactuated position;
   a fifth valve disposed between said Inlet and said third valve, said fifth valve being movable between a deactuated position where said inlet does not communicate with said third valve through said fifth valve and an actuated position where said inlet communicates with said third valve through said fifth valve;
   a third biasing member for biasing said fifth valve into said deactuated position;
   a sixth valve disposed between said Inlet and said first valve, said sixth valve being movable between a deactuated position where said inlet dose not communicate with said first valve through said sixth valve and an actuated position where said Inlet communicates with said first valve through said sixth valve;
   a fourth biasing member of biasing said sixth valve into said deactuated position;
   a seventh valve disposed between said inlet and said first valve, said seventh valve movable between a deactuated position where said Inlet does not communicate with said first valve through said seventh vale and an actuated position where said Inlet communicates with said first valve through said seventh valve;
   an eighth valve disposed between said inlet and said third valve, said eighth valve, being movable between a deactuated position where said inlet does not communicate with said third valve through said eighth valve and an actuated position where said inlet communicates with said second valve through said eighth valve;
   means for prohibiting movement of at least one of said valves when a first portion of said valves are In said actuated position and a second portion of said valves are in said deactuated position; and
   a reset passage extending between said first and second passages and said reset port, each of said first second, third, fourth, fifth and sixth valves being moved to said deactuated position when a pressurized fluid is supplied to said reset port.

10. The control valve system according to claim 9 wherein, said first valve includes a first valve member defining a first fluid passage, said eighth valve communicating with said Inlet through said first fluid passage when said first valve Is in said deactuated position.

11. The control valve system according to claim 10 wherein, said first valve is biased into said deactuated position by pressurized fluid being supplied to said first valve from said inlet, said pressurized fluid passing through said first fluid passage.

12. The control valve system according to claim 10 wherein, said third valve includes a second valve member defining a second fluid passage, said seventh valve member communicating with said Inlet through said second fluid passage when said third valve Is In said deactuated position.

13. The control valve system according to claim 12 wherein, said third valve is biased into said deactuated position by pressurized fluid being supplied to said second valve from said inlet, said pressurized fluid passing through said third fluid passage.

14. The control valve system according to claim 9 wherein said first valve comprises a first valve member slidingly disposed within a first bore defined by said housing, said fifth valve comprises a first valve seat slidingly disposed on said first valve member and said seventh valve comprises a first solenoid valve secured to said housing.

15. The control valve system according to claim 14 wherein, said first valve member defines a fluid passage, said eighth valve communicating with said inlet through said fluid passage when said first valve is in said deactuated position.

16. The control valve system according to claim 15 wherein, said first valve is biased into said deactuated position by pressurized fluid being supplied to said first valve from said inlet, said pressurized fluid passing through said fluid passage.

17. The control valve system according to claim 14 wherein, said third valve comprises a second valve member slidingly disposed within a second bore defined by said housing, said sixth valve comprises a second valve seat slidingly disposed on said second valve member and said eighth valve comprises a second solenoid valve secured to said housing.

18. The control valve system according to claim 17 wherein, said second valve member defines a fluid passage, said seventh valve communicating with said inlet through said fluid passage when said third valve is in said deactuated position.

19. The control valve system according to claim 18 wherein, said third valve is biased into said deactuated position by pressurized fluid being supplied to said third valve from said inlet, said pressurized fluid passing through said fluid passage.

20. A control valve system comprising:

a housing defining a reset port, an inlet, an outlet and an exhaust;

a first passage extending between said inlet and said outlet;

a second passage extending between said outlet and said exhaust;

a first plurality of valves disposed within said first passage, each of said first plurality of valves being movable between a deactuated position where said first passage is closed and an actuated position where said first passage is open;

a second plurality of valves disposed within said second passage, each of said second plurality of valves being movable between a deactuated position where said second passage is open and an actuated position where said second passage is closed; [and]

means for maintaining one of said second plurality of valves in said actuated position when one other of said second plurality of valves is in said deactuated position; and a reset passage extending between said second passage and said reset port, each of said second plurality of valves being moved to said deactuated position when a pressurized fluid is supplied to said reset port.

* * * * *

UNITED STATES PATENT AND TRADEMARK OFFICE
CERTIFICATE OF CORRECTION

PATENT NO. : 5,927,324
DATED : July 27, 1999
INVENTOR(S) : Russell, et al

Page 1 of 3

It is certified that error appears in the above-identified patent and that said Letters Patent is hereby corrected as shown below:

On the Title Page, in the Title, "CROSS FLOW" should be --CROSSFLOW--.

Column 1 line 1, "CROSS FLOW" should be --CROSSFLOW--

Column 3, line 67, "doses" should be --closes--.

Column 4, line 18, "dosing" should be --closing--.

Column 7, line 20, Claim 1, "Is" should be --is--.

Column 7, line 35, Claim 3, delete "fluid".

Column 7, line 39, Claim 4, delete "fluid".

Column 7, line 48, Claim 6, delete "fluid".

Column 7, line 54, Claim 7, delete "fluid".

Column 8, line 2, Claim 9, after "reseat" insert --port--.

Column 8, line 2, Claim 9, "Inlet" should be --inlet--.

Column 8, line 11, Claim 9, "Is" should be --is--.

Column 8, line 27, Claim 9, "Is" should be --is--.

Column 8, line 29, Claim 9, "Into" should be --into--.

UNITED STATES PATENT AND TRADEMARK OFFICE
CERTIFICATE OF CORRECTION

PATENT NO. : 5,927,324
DATED : July 27, 1999
INVENTOR(S) : Russell et al

It is certified that error appears in the above-identified patent and that said Letters Patent is hereby corrected as shown below:

Column 8, line 30, Claim 9, "Inlet" should be --inlet--.

Column 8, line 38, Claim 9, "Inlet" should be --inlet--.

Column 8, line 40, Claim 9, "dose" should be --does--.

Column 8, line 42, Claim 9, "Inlet" should be --inlet--.

Column 8, line 48, Claim 9, "Inlet" should be --inlet-.

Column 8, line 49, Claim 9, "vale" should be --valve--.

Column 8, line 50, Claim 9, "Inlet" should be --inlet--.

Column 8, line 60, Claim 9, "In" should be --in--.

Column 8, line 64, Claim 9, after "first" insert --,--.

Column 9, line 4, Claim 10, "Inlet" should be --inlet--.

Column 9, line 5, Claim 10, "Is" should be --is--.

Column 9, line 13, Claim 12, "Inlet" should be --inlet--.

UNITED STATES PATENT AND TRADEMARK OFFICE
CERTIFICATE OF CORRECTION

PATENT NO. : 5,927,324
DATED : July 27, 1999
INVENTOR(S) : Russell et al

It is certified that error appears in the above-identified patent and that said Letters Patent is hereby corrected as shown below:

Column 9, line 14, Claim 12, "Is In" should be --is in--.

Column 10, line 30, Claim 20, delete "[and]".

Signed and Sealed this

Twenty-fifth Day of April, 2000

Attest:

Q. TODD DICKINSON

*Attesting Officer*     *Director of Patents and Trademarks*